United States Patent [19]

Williams

[11] 4,222,687
[45] Sep. 16, 1980

[54] APPARATUS FOR BORING SEWER PIPE OPENING IN MANHOLE BASE

[76] Inventor: Richard L. Williams, 9180 Parker Rd., Harrod, Ohio 45850

[21] Appl. No.: 914,557

[22] Filed: Jun. 12, 1978

[51] Int. Cl.³ .............................................. B23B 41/00
[52] U.S. Cl. ...................................... 408/79; 173/35; 408/87; 408/88
[58] Field of Search ................. 408/79, 72, 88, 1, 103, 408/99, 145, 108, 87, 100, 101; 173/34, 35

[56] References Cited

U.S. PATENT DOCUMENTS

| | | | |
|---|---|---|---|
| 2,886,290 | 5/1959 | Bremnan et al. | 173/34 |
| 3,370,654 | 2/1968 | Skendrovic | 173/34 |
| 3,370,888 | 2/1968 | Skendrovic | 173/35 X |
| 3,446,292 | 5/1969 | Stauffer | 173/35 |
| 3,473,616 | 10/1969 | Johanssan | 173/35 |
| 4,009,545 | 3/1977 | Rossborough | 408/103 X |

Primary Examiner—William R. Briggs
Attorney, Agent, or Firm—Albert L. Jeffers; John F. Hoffman

[57] ABSTRACT

Apparatus for boring a sewer pipe opening in the side wall of a concrete manhole base including a supporting frame adapted to be positioned over the open end of a vertically disposed manhole base. A second frame is suspended from the supporting frame and adapted to be lowered thereby into the interior of the manhole base. Hydraulically actuated jaws on the second frame engage opposite points on the inner surface of the side wall of the manhole base so as to secure the second frame at a selected location. A boring bit-driving motor is mounted on the second frame for transverse movement thereon with respect to the axis of the manhole base thereby to bore the sewer pipe opening outwardly through the side wall thereof.

7 Claims, 9 Drawing Figures

APPARATUS FOR BORING SEWER PIPE OPENING IN MANHOLE BASE

BACKGROUND OF THE INVENTION

1. Field of the Invention

This invention relates generally to apparatus for boring an opening in the side wall of a hollow member, and more particularly to apparatus for boring a sewer pipe opening in the side wall of a manhole base.

2. Description of the Prior Art

Manholes are commonly provided in sanitary and storm sewer lines, and commonly comprise a cylindrical concrete base section having an integral bottom and an open upper end; the base section is in essence a section of bell and spigot concrete pipe with the spigot end facing upwardly and a poured bottom wall at what otherwise would be the bell end. Depending upon the depth of the manhole, other sections of bell and spigot concrete pipe may be placed on top of the base section.

It is necessary to provide openings in the side wall of the base section of a manhole, or sometimes in upper sections, to receive sewer pipe. The sewer pipe connections to the manhole are not necessarily at diametrically opposite points, i.e., they may be radially and/or vertically displaced with the result that the sewer pipe openings in each manhole must be customed-positioned depending upon the location of the manhole in the sewer system.

In the past, sewer pipe openings in manhole sections have been customed-located when the manhole section was initially cast by the use of a suitable mandrel or mandrels. However, it is not uncommon for the location of a given sewer line to deviate from the plan and thus, the location of the sewer pipe openings in a particular custom-cast manhole may not be correct when the manhole section is delivered to the site, which has resulted in scrapping the section.

Apparatus has been provided for boring sewer pipe openings in the side wall of a manhole section from the outside; however, it has been difficult to secure the apparatus to the manhole section with the result that the diamond tips on the boring bits tend to tear-off thus destroying the bit.

It is therefore desirable to provide an improved apparatus for boring openings in the side wall of a hollow member, such as a concrete manhole section, in which the boring apparatus is securely located with respect to the hollow member.

SUMMARY OF THE INVENTION

The invention, in its broader aspects, provides apparatus for boring an opening in the side wall of a hollow rigid member, such as a concrete manhole base. A frame is provided adapted to be positioned within the hollow member and having means thereon for selectively engaging points on the inner surface of the side wall of the hollow member respectively on opposite sides thereof thereby to secure the frame at the selected location. Means are provided on the frame for boring the opening outwardly through the side wall.

It is accordingly an object of the invention to provide improved apparatus for boring an opening in the side wall of a hollow rigid member.

Another object of the invention is to provide apparatus for boring an opening in the side wall of a hollow rigid member outwardly from the interior thereof.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 9 is a fragmentary side view showing a modification of the apparatus of FIG. 1.

DESCRIPTION OF THE PREFERRED EMBODIMENT

Figure 1:
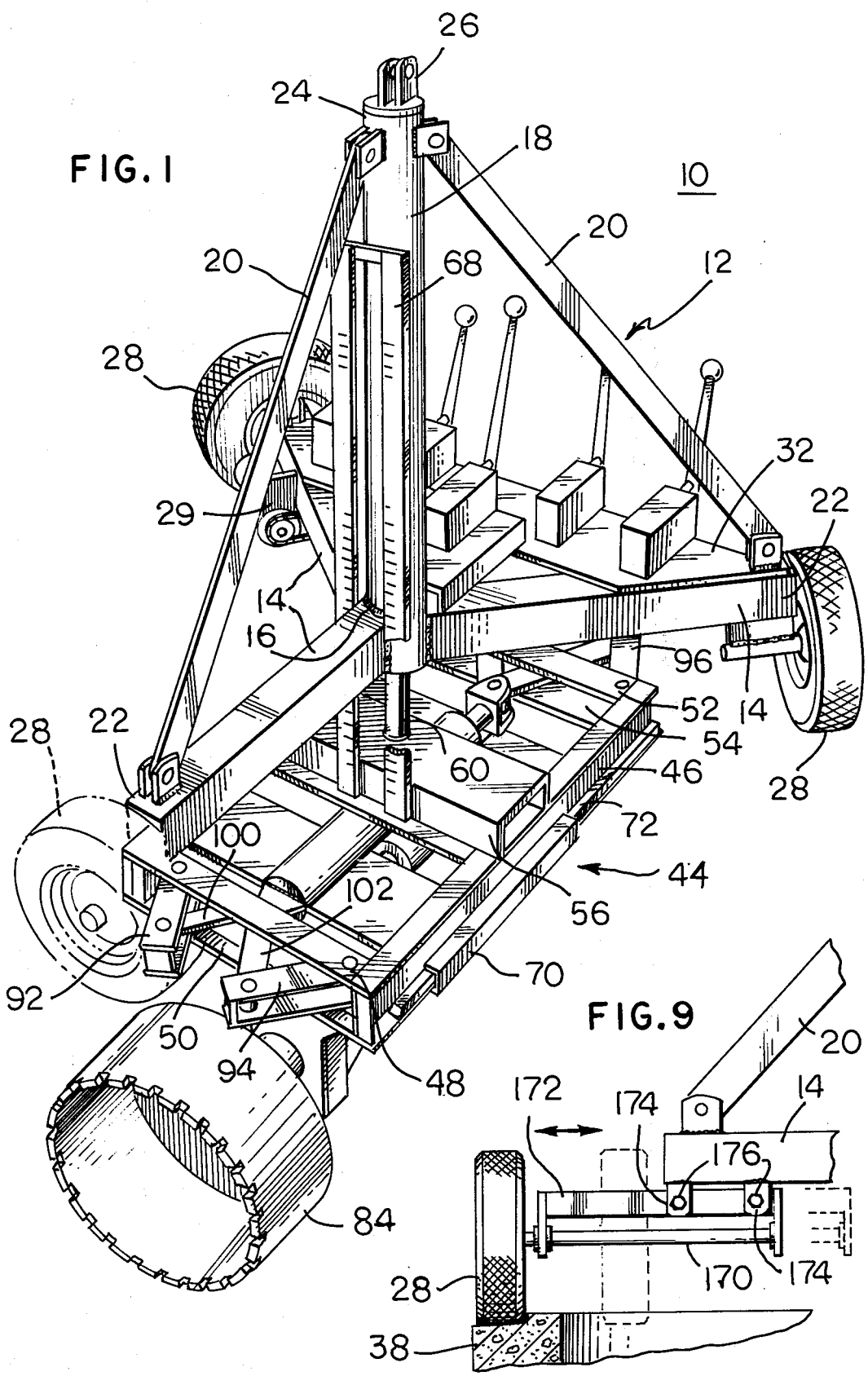
FIG. 1 is a view in perspective showing one embodiment of the invention.
Figure 2:
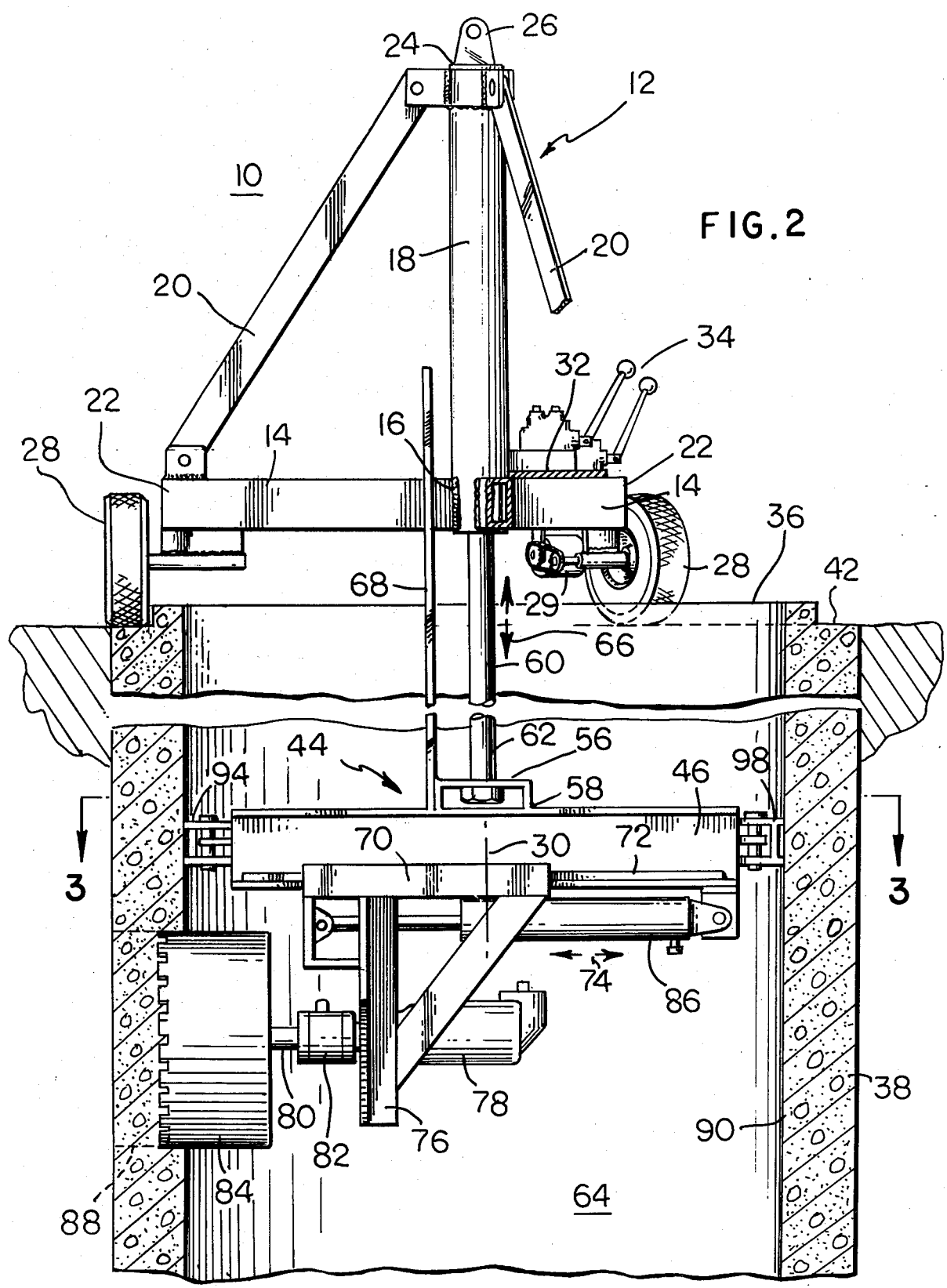
FIG. 2 is a side view, partly in cross-section, showing use of the apparatus of FIG. 1 for boring of a side wall opening in a manhole base.
Figure 3:
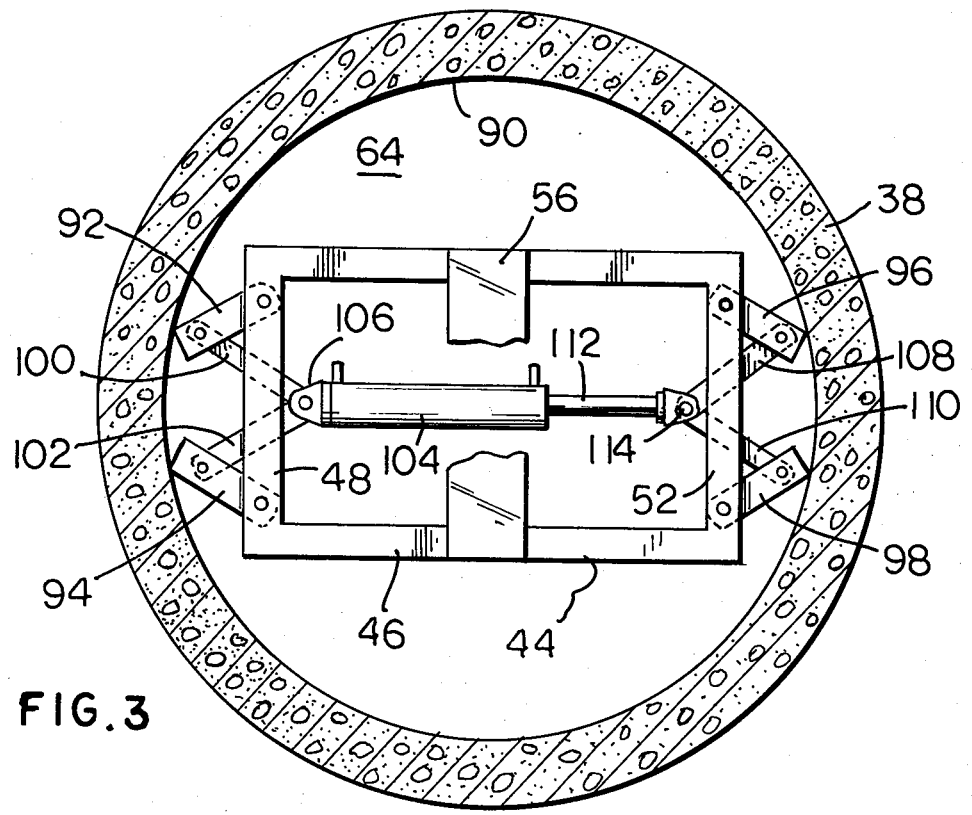
FIG. 3 is a top, cross-sectional view, partly broken away, taken generally along the line 3—3 of FIG. 2.
Figure 5:
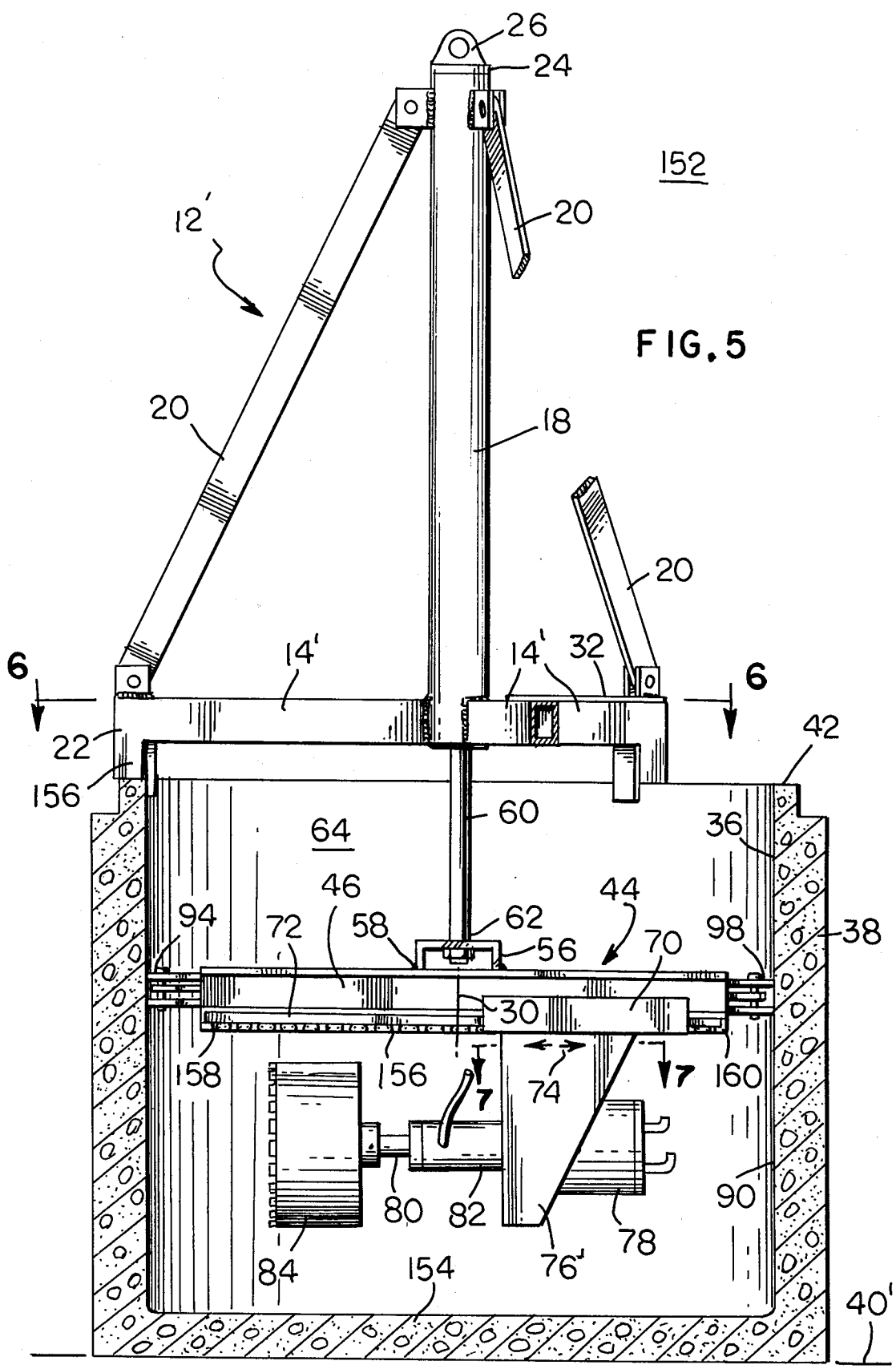
FIG. 5 is a side, cross-sectional view, partly broken away, showing another embodiment of the invention.
Figure 6:
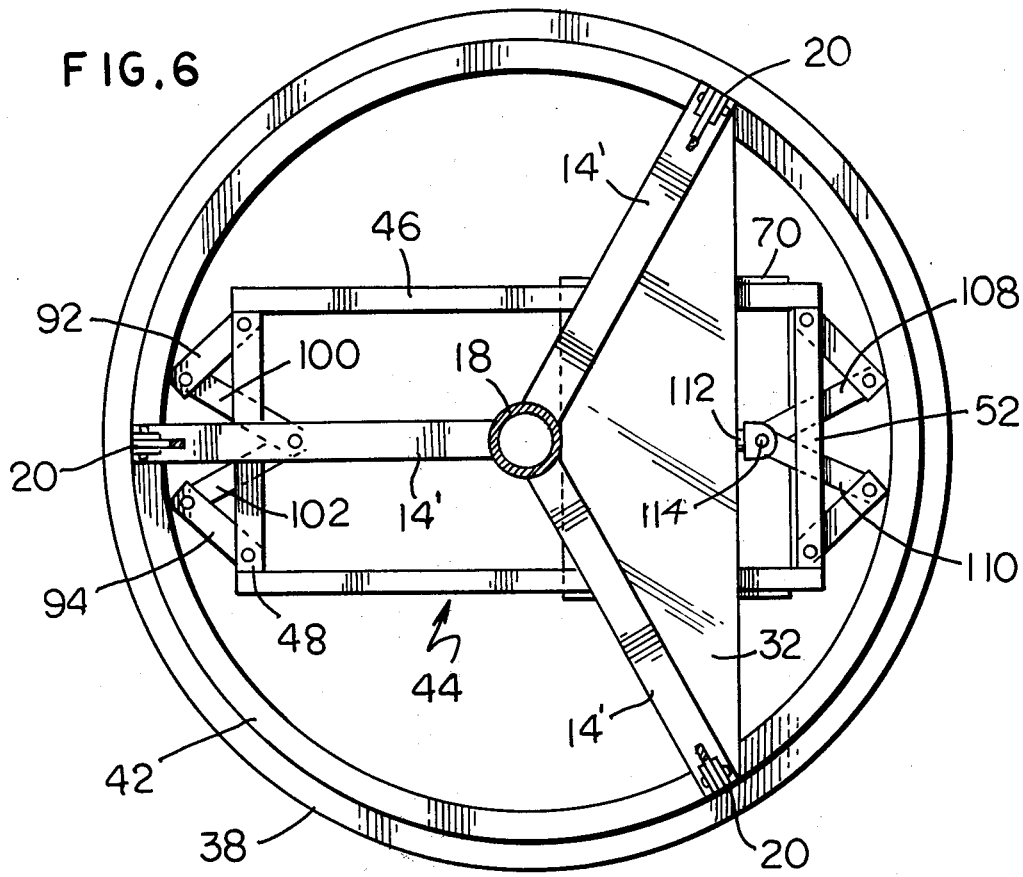
FIG. 6 is a top, cross-sectional view taken generally along the line 6—6 of FIG. 5.

Referring now to FIGS. 1, 2 and 3, one embodiment of the invention is shown, generally indicated at 10, intended for use in boring sewer pipe-receiving openings in the side wall of a manhole section prior to installation, as at the manhole production facility. Apparatus 10 includes upper frame assembly 12 comprising, in the illustrated embodiment, three equally spaced, horizontally extending frame members 14 secured at their inner ends, as by welding at 16, to vertically extending hydraulic cylinder 18. Brace members 20 respectively connect outer ends 22 of frame members 14 to upper end 24 of cylinder 18. Clevis 26 mounted on upper end 24 of cylinder 18 permits lifting and transporting apparatus 10, as by a suitable crane.

Wheels 28 are provided rotatably mounted on ends 22 of frame members 14 and respectively having their axes aligned with members 14 so as to permit rotation of apparatus 10 about axis 30 of cylinder 18. Platform 32 is mounted on and extends between two of the frame members 14 and serves to support the various manual control valves 34. Hydraulic motor 29 is coupled to drive one wheel 28.

In use, apparatus 10 is positioned over open end 36 of cylindrical manhole section 38 with wheels 28 supporting apparatus 10 on spiggot end 42 at open end 36 of manhole section 38. Apparatus 10 is positioned so that axis 30 of cylinder 18 is generally co-extensive with the axis of manhole section 38 (FIG. 2).

Lower frame assembly 44 is provided formed of parallel side channels 46 joined at opposite ends, as by welding, by transverse members 48, 50 and 52, 54. Channel 56 extends transversely across side channels 46 intermediate their ends and is connected thereto, as by welding at 58. Piston rod 60 of hydraulic cylinder 18 has its lower end 62 connected to transverse channel member 56. Extension or retraction of piston rod 60 of cylinder 18 thus lowers or raises frame assembly 44 within the interior 64 of manhole section 38, as shown by arrows 66 in FIG. 2. Depth gauge 68 is secured to transverse member 56 and straddles one upper frame member 14, thus preventing rotation of frame assembly 44 with respect to frame assembly 12.

Slide 70 is supported on lower flanges 72 of side channel member 46 for linear movement in a direction transverse to axis 30, as shown by arrows 74 in FIG. 2. Bracket 76 depends from slide 70 and boring bit-driving hydraulic motor 78 mounted thereon. Motor 78 rotatably drives arbor 80 through water coupling 82 which feeds cooling water in conventional fashion to boring bit 84. Slide 70, bracket 76, drive motor 78 and boring bit 84 are advanced and retracted by hydraulic cylinder 86. It will now be seen that frame assemblies 12, 44 are rotated to the desired rotational position on wheels 28 by actuation of drive motor 29, and that frame 44 is lowered by actuation of cylinder 18 to the desired elevational position for boring opening 88 outwardly through side wall 90 of manhole section 38 at the desired location therein.

In order to secure lower frame assembly 44 at the desired location within manhole section 38, lever members 92, 94 are pivotally mounted at spaced points on transverse frame members 48, 50, and lever members 96, 98 are pivotally mounted at spaced points on transverse frame members 52, 54 (FIGS. 1 and 3). Link members 100, 102 respectively have their outer ends pivotally connected to lever members 92, 94 and their inner ends pivotally connected to one end of free floating-hydraulic cylinder 104, as at 106. Link members 108, 110 respectively have their outer ends pivotally connected to lever members 96, 98 and have their inner ends pivotally connected to piston 112 of hydraulic cylinder 104, as at 114. It will be seen that pivoted levers 92, 94 and links 100, 102, and pivoted levers 96, 98 and links 108, 110 form toggles, actuation of cylinder 104 to extend piston rod 112 causing outward pivoting of lever members or jaws 92, 94, 96, 98 so that their outer ends engage inner surface 90 of the side wall of manhole section 38. It will further be seen that the provision of free floating cylinder 104 and the toggle linkages accommodate any unevenness or out-of-round condition of inner surface 90. Finally, it will be seen that the toggle action provided by the two linkages respectively connected to cylinder 104 and piston rod 112 provide tight, secure gripping engagement with inner surface 90 of the side wall of manhole section 38 thereby to prevent vibratory movement or slippage of boring bit 84 during the boring operation.

Figure 4:
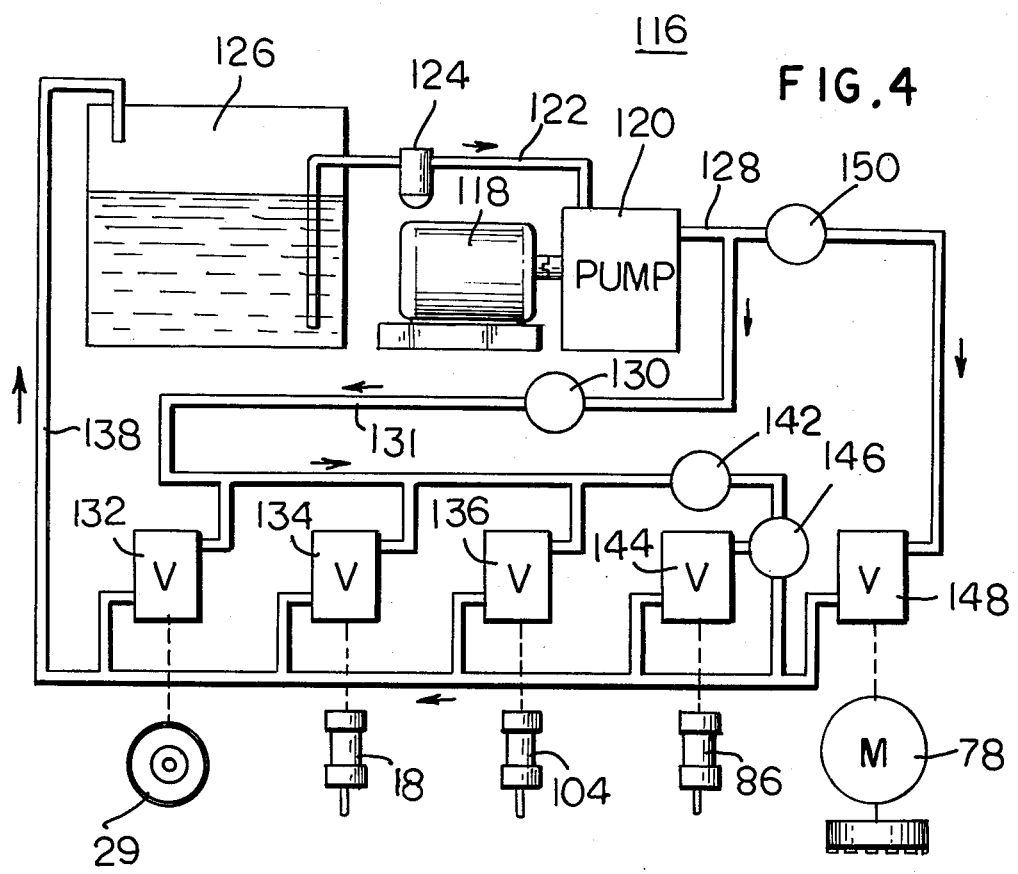
FIG. 4 is a schematic diagram showing the hydraulic system used with the apparatus of the previous figures.

Referring now to FIG. 4, wheel driving motor 29, depth control cylinder 18, lower frame locking cylinder 104, feed control cylinder 86 and cutter drive motor 78 are powered by hydraulic system 116. Here, driving motor 118, which may be either a suitable electric motor or gasoline engine, drives hydraulic pump 120 which withdraws hydraulic fluid through section line 122 and filter 124 from storage tank 126. Pressure line 128 from pump 120, which may deliver hydraulic fluid at a pressure of 3500 p.s.i., is connected by pressure reducer 130, which may reduce the pressure of the hydraulic fluid to 400 p.s.i., and pressure line 131 to control valves 132, 134 and 136 coupled respectively to actuate wheel drive motor 29, depth cylinder 18 and frame lock cylinder 104, valves 132, 134 and 136 discharging to discharge line 138. Pressure line 131 which couples pressure reducer 130 to control valves 132, 134, 136 is connected to another pressure reducer 142, which may reduce the hydraulic pressure still further to 50 p.s.i., pressure reducer 142 being coupled to control valve 144 for feed control cylinder 86 by preset flow control valve 146. Pressure line 128 from pump 120 is coupled to control valve 148 for boring bit drive motor 78 by preset flow control valve 150. It will be understood that each of control valves 132, 134, 136, 144 and 148 is a two-way valve, valves 132, 134, 136, 144 and 148 comprising the group of valves 34 supported on member 32.

Referring now to FIGS. 5-8 of the drawings, in which like elements are indicated by like reference numerals and similar elements by primed reference numerals, another embodiment of the invention is shown, generally indicated at 152, also intended for use in boring sewer pipe-receiving openings in the side wall of a manhole section prior to installation of the manhole, as at the manhole production facility.

Here, upper frame assembly 12' again includes frame members 14' and brace members 20; however, in this embodiment in which manhole base 38 has bottom wall 154 resting on the ground or floor 40', upper frame 12' is supported on top edge 42 of manhole base 38 by means of brackets 156 depending from ends 22 of frame member 14 which respectively engage top edge 42.

Figure 7:
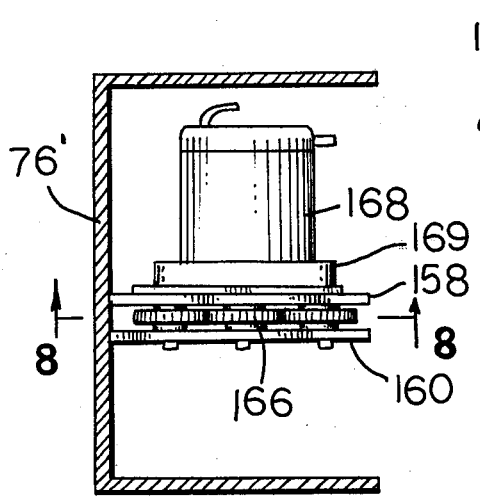
FIG. 7 is a fragmentary, top, cross-sectional view, taken generally along the line 7—7 of FIG. 5.
Figure 8:
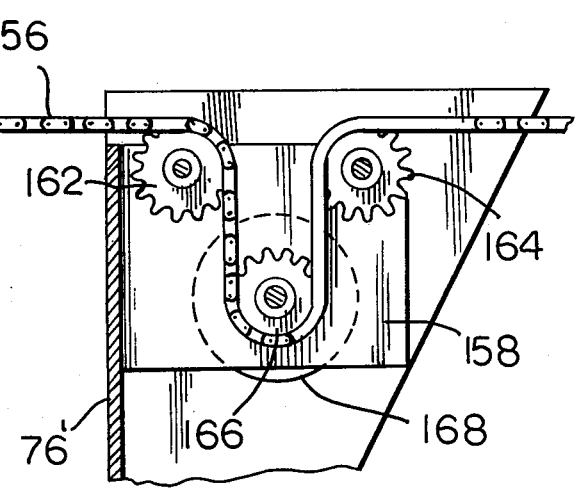
FIG. 8 is a fragmentary, side, cross-sectional view, taken generally along the line 8—8 of FIG. 7.

In this embodiment, which otherwise is very similar to the previous embodiment, slide 70 and bracket 76' supporting boring bit drive motor 78 are moved laterally on frame assembly 44 by means of chain 156 having its opposite ends 158, 160 secured to transverse frame member 50, 54 (FIG. 1) of frame assembly 44. Referring particularly to FIGS. 7 and 8, bracket 76' has a pair of spaced, parallel members 158, 160 mounted thereon. Sprockets 162, 164, 166 are rotatably mounted between plates 158, 160. Sprockets 162, 164 are freely rotating while sprocket 166 is connected to hydraulic drive motor 168 through suitable gear reduction 169 which, in essence, replaces the feed cylinder 86 of the previous embodiment. Feed drive motor 168 and gear box 169 are mounted on plate 158 and chain 156 is trained around sprockets 162, 166 and 164, as shown in FIG. 8. It will now be readily seen that actuation of feed drive motor 168 thereby to rotate sprocket 166 in either direction will advance bracket 76' and slide 70 along chain 156, as shown by arrows 74.

It will be readily seen that a hydraulic control system as shown in FIG. 4 and described above may readily be employed with the embodiment of FIGS. 5 through 8.

Referring now to FIG. 9, wheels 28 may be adjustably mounted on frame members 14 in order to adapt apparatus 10 for manholes of different sizes. Here, each wheel 28 is rotatably mounted on elongated shaft 170 secured to elongated bar 172. Bar 172 is slidably mounted in brackets 174 secured to the respective frame member 14 adjacent outer end 22 with threaded fasteners 176 securing slide 172 at the desired radial position for wheel 28.

It will be understood that lower frame assembly 44 may be used alone without upper frame assembly 12, and may be suspended, as by a cable and crane or winch (not shown) for use in on-site boring of an opening in the side wall of a previously installed manhole section.

It will now be seen that the invention provides simple apparatus for drilling an opening in the side wall of a hollow rigid member, such as a concrete manhole section or a section of concrete pipe, the opening being bored outwardly from the interior thus requiring less torque and further, the apparatus being securely locked to the member to prevent movement, slippage or shatter of the boring bit with respect to the member.

While there have been described above the principles of this invention in connection with specific apparatus, it is to be clearly understood that this description is made only by way of example and not as a limitation to the scope of the invention.

What is claimed is:

1. Apparatus for boring an opening in the side wall of a hollow rigid member, said side wall having an inner surface surrounding an interior space, said apparatus comprising: a frame adapted to be positioned within said space; means on said frame for selectively engaging points on said inner surface of said side wall respectively on opposite sides of said space thereby to secure said frame at a selected location in said space; and means on said frame for boring said opening outwardly from said space through said side wall; said side wall engaging means comprising a pair of lever members at each frame end, each of said lever members having opposite ends, one end of each lever member of each pair being pivotally connected to a respective frame end at laterally spaced points thereon, a pair of link members respectively associated with each pair of said lever members, each of said link members having opposite ends, the link members of each pair having one end thereof pivotally connected to a lever member of a respective pair at a point spaced from the pivoted end thereof, the other ends of the link members of each pair being pivotally connected together at a pivot point thereby providing a toggle linkage with the respective pair of said lever members, and means operatively connected to said pivot points of both of said linkages for selectively extending and retracting the same thereby selectively to move said other ends of said lever members into and out of engagement with said inner surface of said side wall.

2. The apparatus of claim 1 wherein said extending and retracting means comprises a fluid power cylinder.

3. The apparatus of claim 2 wherein said supporting means comprises a second frame adapted to be supported above said open end of said hollow member, said second frame having a fluid power cylinder thereon generally on said axis and operatively connected to said first-named frame for suspending the same in said space for selective vertical movement therein between the ends of said hollow member to said selected location, said boring means comprising power drive means mounted on said first frame for linear movement transverse to said axis and having an arbor for mounting a boring tool, and means for selectively advancing and retracting said power drive means.

4. The apparatus of claim 3 wherein said second frame has wheels thereon for supporting the same on and above said open end, said wheels being adapted to rotate said second frame about said axis thereby to locate said first frame radially in said space.

5. The apparatus of claim 4 further comprising means for adjustably mounting said wheels on said second frame for selective radial positioning with respect to said axis.

6. The apparatus of claim 3 wherein said open end of said hollow member is defined by an edge, said second frame having portions adapted to engage said edge for supporting said second frame above said open end.

7. Apparatus for boring a pipe-receiving opening in the side wall of a vertically disposed concrete manhole section having an upwardly facing open end and a bottom end, said side wall having an inner surface surrounding an interior space, said apparatus comprising: a frame having opposite ends adapted to be positioned within and extending horizontally across said space; means on said opposite ends of said frame for selectively engaging points on said inner surface of said side wall respectively on diametrically opposite sides of said space thereby to secure said frame at a selected location in said space; and means on said frame for boring said opening outwardly from said space through said side wall, said boring means comprising first power drive means mounted on said frame for linear movement thereon and having an arbor for mounting a boring tool, and second power drive means for selectively advancing and retracting said first power drive means, said advancing and retracting means including an elongated, flexible element having opposite ends respectively secured to said frame at spaced points thereon, rotatable propelling means engaging said elongated element for movement therealong, and reversible power drive means on said frame and operatively coupled to said propelling means.

* * * * *